(12) United States Patent
Jeng

(10) Patent No.: US 12,674,445 B2
(45) Date of Patent: Jul. 7, 2026

(54) VALVES WITH OVERDRIVEN PROTECTION

(71) Applicant: DAOZ International Holding Limited, Wan Chai (HK)

(72) Inventor: Sheng-Hun Jeng, HsinChu (TW)

(73) Assignee: DAOZ INTERNATIONAL HOLDING LIMITED, Wan Chai (HK)

( * ) Notice: Subject to any disclaimer, the term of this patent is extended or adjusted under 35 U.S.C. 154(b) by 118 days.

(21) Appl. No.: 18/514,234

(22) Filed: Nov. 20, 2023

(65) Prior Publication Data

US 2025/0163904 A1    May 22, 2025

(51) Int. Cl.
| | |
|---|---|
| *F04B 43/00* | (2006.01) |
| *F04B 43/067* | (2006.01) |
| *F16K 7/16* | (2006.01) |

(52) U.S. Cl.
CPC ........ *F04B 43/0081* (2013.01); *F04B 43/067* (2013.01); *F04B 2201/0201* (2013.01); *F16K 7/16* (2013.01)

(58) Field of Classification Search
CPC . F16K 1/52; F16K 1/523; F16K 7/126; F16K 7/16; Y10T 137/8225
USPC ................................................ 251/285, 331
See application file for complete search history.

(56) References Cited

U.S. PATENT DOCUMENTS

| | | | | |
|---|---|---|---|---|
| 3,910,308 | A * | 10/1975 | Mack | F16K 31/60 137/553 |
| 4,421,294 | A * | 12/1983 | Parkison | F16K 7/16 251/86 |
| 5,295,662 | A * | 3/1994 | Yamaji | F16K 41/12 251/274 |
| 5,377,956 | A * | 1/1995 | Muller | F16K 7/126 74/25 |
| 5,823,509 | A * | 10/1998 | Daniels | F16K 1/302 251/285 |
| 6,196,523 | B1 * | 3/2001 | Miyata | F16K 31/50 251/285 |
| 7,337,805 | B2 * | 3/2008 | Brown | F16K 31/1221 137/625.33 |
| 7,677,530 | B2 * | 3/2010 | Hasunuma | F16K 27/02 251/285 |
| 2008/0078968 | A1 * | 4/2008 | Fukano | F16K 31/60 251/309 |
| 2008/0149874 | A1 * | 6/2008 | Fukano | F16K 7/16 137/551 |
| 2009/0020723 | A1 * | 1/2009 | Masamura | F16K 7/16 251/331 |
| 2020/0088307 | A1 * | 3/2020 | Miura | F16K 1/523 |

* cited by examiner

*Primary Examiner* — Robert K Arundale
(74) *Attorney, Agent, or Firm* — MUNCY, GEISSLER, OLDS & LOWE, P.C.

(57) ABSTRACT

A valve comprises a drive rod, a diaphragm, and a chamber. The chamber contains the diaphragm, and the chamber is blocked by the diaphragm driven to reach a bottom of the chamber. A limiting element encircles the drive rod to contain a section of the drive rod, and the limiting element is configured to prevent the drive rod from being overdriven.

9 Claims, 11 Drawing Sheets

10

100

160

161

162

163

164

166

VALVES WITH OVERDRIVEN PROTECTION

FIELD

The present application relates to valves, and more particularly to valves with diaphragms for controlling fluid such as chemical solution, water or the like.

BACKGROUND OF THE INVENTION

The controlled amounts of chemical solutions or water are required in many manufacturing processes, for example, when a pharmaceutical factory produces drugs, or when a semiconductor factory coats the surface of a wafer to form a film of uniform thickness. Therefore, a precise valve is required for many industries.

A diaphragm valve separates controlling elements and the liquid by the diaphragm, so that the controlling elements above the diaphragm are not corroded by the liquid. However, a valve is delicate and thus easily damaged by the excessive force resulted from the overdriven. Especially, the leakage and the inaccuracy of the flow control are happened if the diaphragm sealing is damaged. Therefore, there is a requirement for a valve that can prevent the overdriven.

SUMMARY OF THE INVENTION

The present disclosure reveals valves with overdriven protection to accurately control the depth of the drive element and prevent the valve from being damaged.

One aspect of the present disclosure provides a valve comprising a controller and a body. The controller comprises a drive rod, a diaphragm, and an inner case. The drive rod is driven to move the diaphragm. The inner case is installed inside the controller wherein the inner case has a through hole for containing a part of the drive rod. The body comprises an opening and a chamber. The opening is covered by the controller. The chamber contains the diaphragm moving inside the chamber wherein the chamber is blocked by the diaphragm driven to reach a bottom of the chamber. A limiting element encircles the drive rod to contain a section of the drive rod, and the limiting element is configured to be fixed at a position of the drive rod to prevent the drive rod from being overdriven.

Another aspect of the present disclosure provides a valve comprising a controller and a body. The controller comprises a drive rod, a cylinder, a pneumatic hole, and a diaphragm. The drive rod is driven to move the diaphragm, and the drive rod has a piston in a middle section. The cylinder covers the controller. The pneumatic hole moves the drive rod by pumping air into or exhausting air from a space between the cylinder and the piston. The body comprising an opening, and a chamber. The opening is covered by the controller. The chamber contains the diaphragm moving inside the chamber, and the chamber is blocked by the diaphragm driven to reach a bottom of the chamber. A limiting element is installed on an inner case to encircle the drive rod to contain a section of the drive rod and separate the piston from the inner case. A thickness of the limiting element is configured to set a length of the section of the drive rod to prevent the drive rod from being overdriven.

Another aspect of the present disclosure provides a valve comprising a controller and a body. The controller comprises a drive rod, a diaphragm, and an inner case. The drive rod is driven to move the diaphragm. The inner case is installed inside the controller wherein the inner case has a through hole for containing a part of the drive rod. The body comprises an opening and a chamber. The opening is covered by the controller. The chamber contains the diaphragm moving inside the chamber wherein the chamber is blocked by the diaphragm driven to reach a bottom of the chamber. A limiting element encircles the drive rod to contain a section of the drive rod, and the limiting element is configured to prevent the drive rod from being overdriven.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF DRAWINGS

A more complete understanding of the present disclosure may be derived by referring to the detailed description and claims when considered in connection with the example embodiments shown in the drawings, in which:

DETAILED DESCRIPTION OF THE INVENTION

Figure 1:
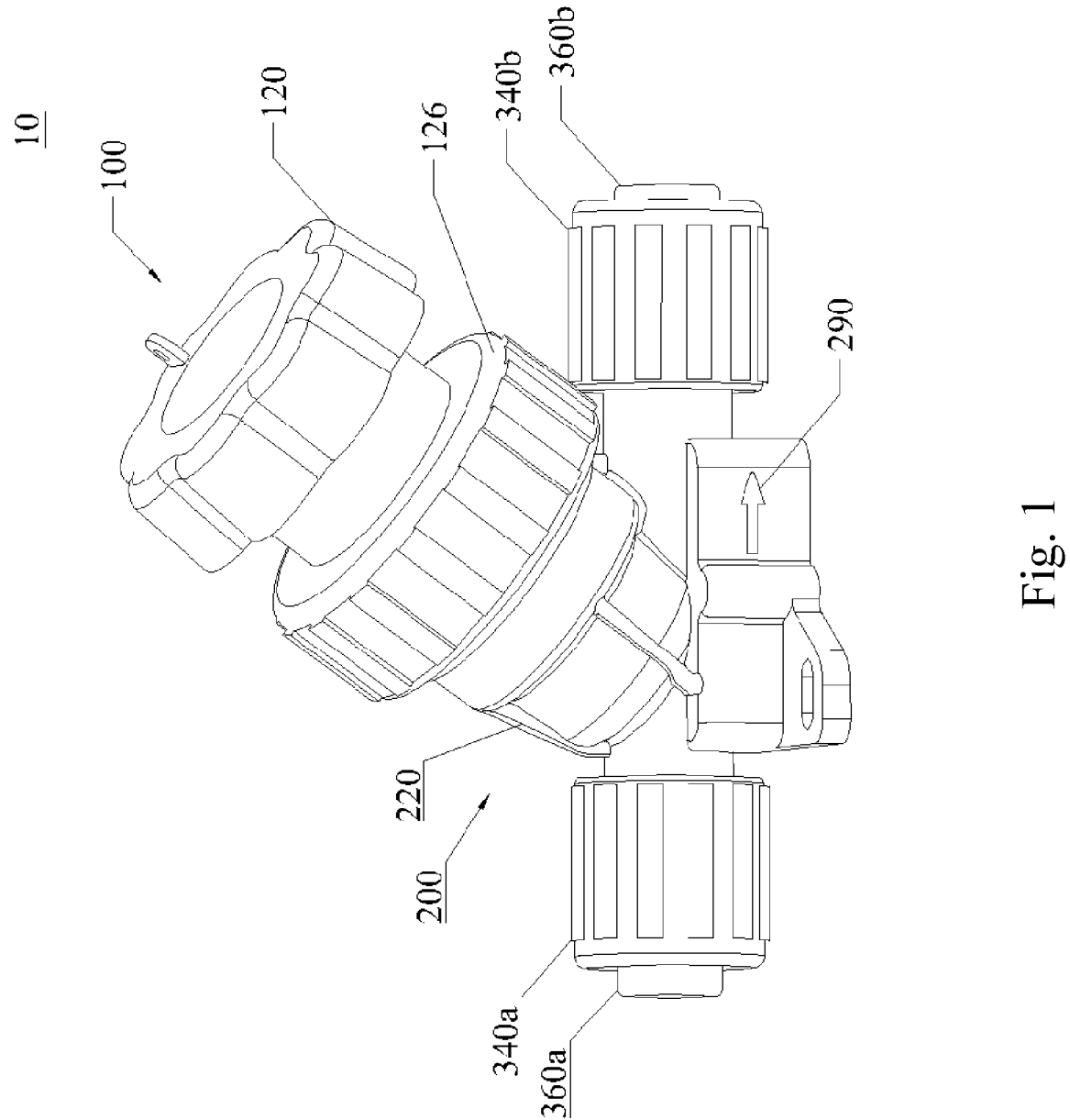
FIG. 1 is a perspective view of a diaphragm valve according to an embodiment of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral. It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept. The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Valves according to embodiments of the present disclosure will be described with reference to the drawings. The present invention will be described in detail below with reference to the accompanying drawings.

Figure 2:
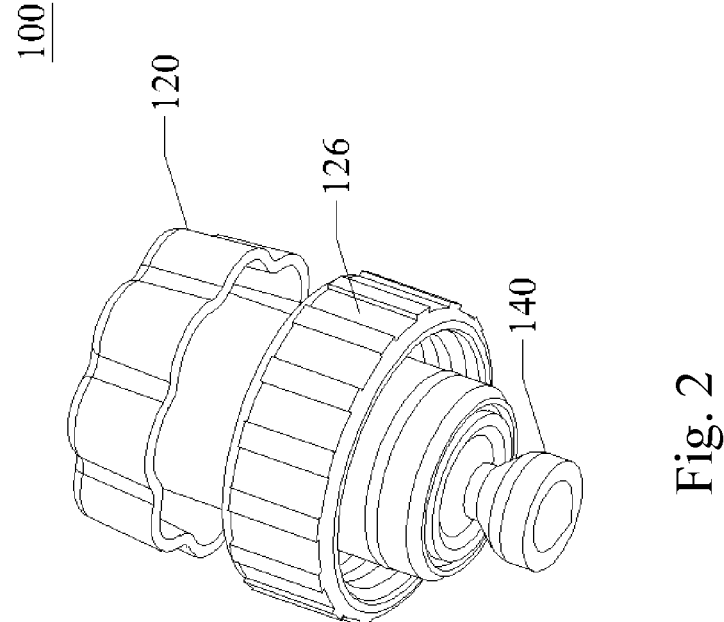
FIG. 2 is a perspective view of a controller of the diaphragm valve in FIG. 1.
Figure 3:
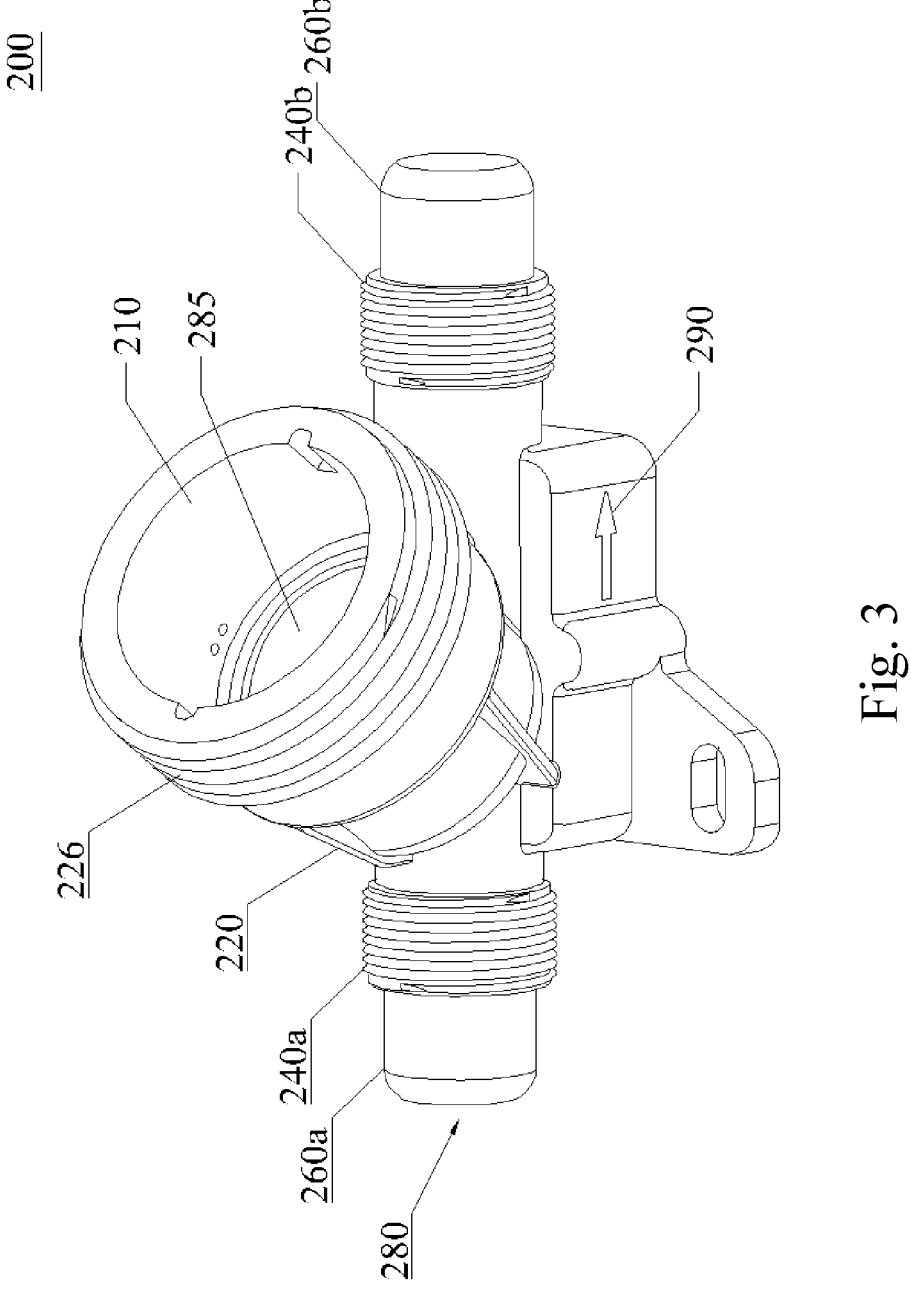
FIG. 3 is a perspective view of a body of a diaphragm valve in FIG. 1.

FIG. 1 is a perspective view of a diaphragm valve 10 according to an embodiment of the present disclosure. FIG. 2 is a perspective view of a controller 100 of the diaphragm valve 10 in FIG. 1. And, FIG. 3 is a perspective view of a body 200 of a diaphragm valve 10 in FIG. 1. As shown in FIG. 1, the diaphragm valve 10 of the present invention comprises a controller 100 and a body 200. As shown in FIG. 2, the controller 100 comprises a knob 120 and a diaphragm 140. The diaphragm 140 is connected to and driven by the knob 120. As shown in FIG. 3, the body 200 comprises an opening 210, a chamber 285, and a channel 280. The opening 210 is covered and sealed by the controller 100 as shown in FIG. 1, and a threaded sleeve 126 of the controller 100 is threaded into a threaded tube 226 of the opening 210.

As shown in FIGS. 1 and 3, the diaphragm valve 10 is installed between pipes 360a, 360b. The pipes 360a, 360b are connected respectively to an inlet 260a and an outlet 260b of the diaphragm valve 10 while the tube connectors 340a, 340b are set in 240a, 240b respectively. Moreover, the reinforce ribs 220 strengthen the structure of the chamber 285, and the arrow 290 shown in a side notes the direction of the flow. As used herein, the element "pipe" is intended to include "tubing" as well.

Figure 4:
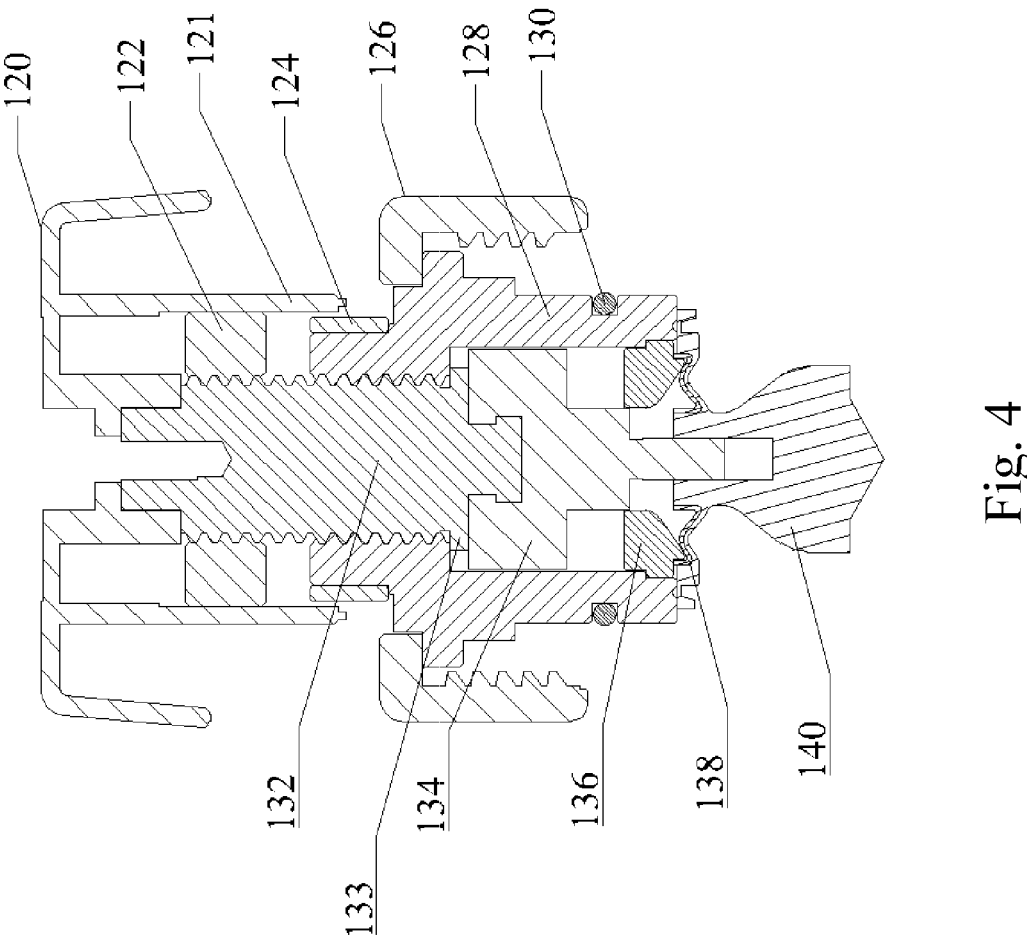
FIG. 4 is a cross-sectional view of the controller according to the embodiment of FIG. 2.
Figure 5A:
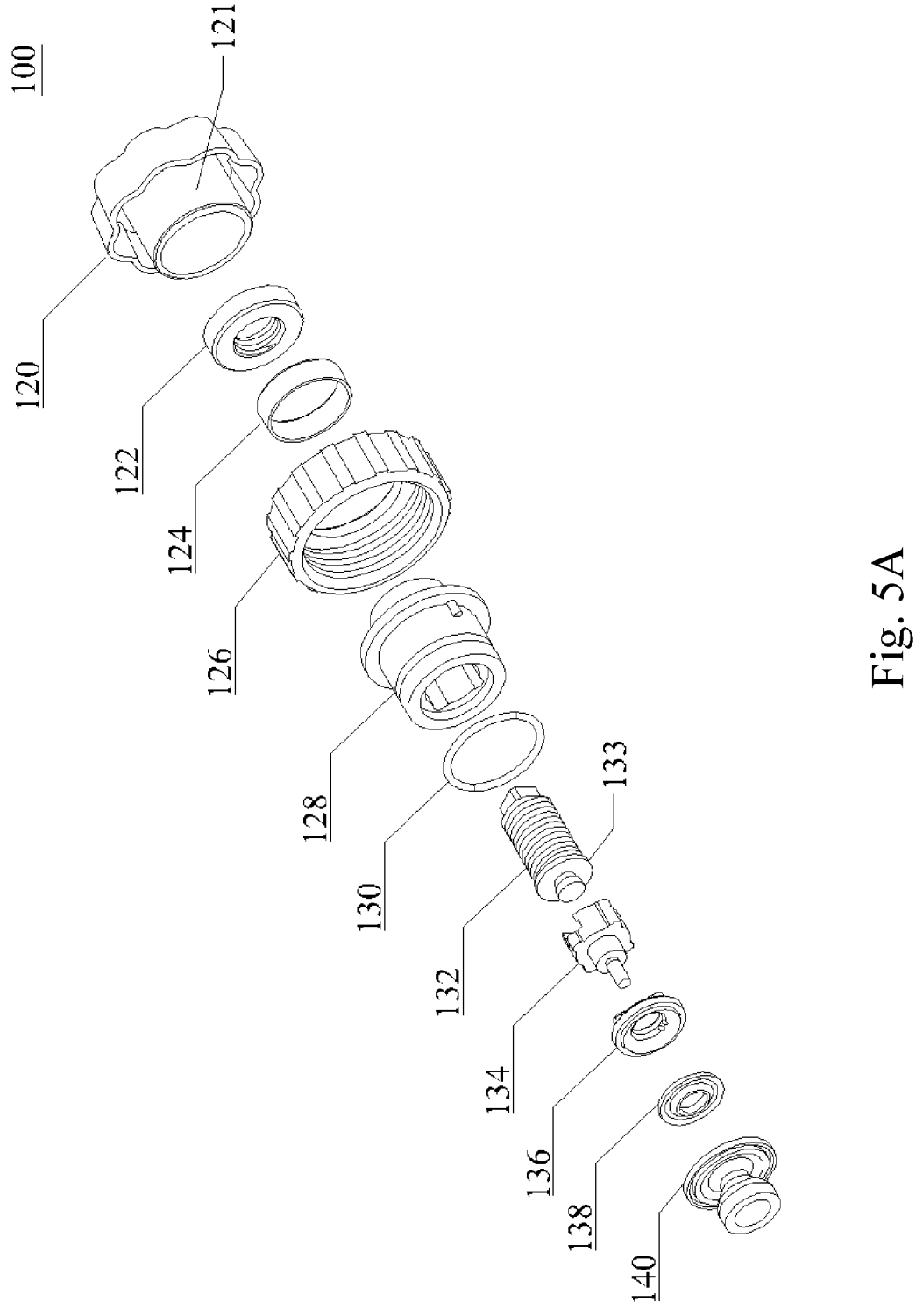
FIG. 5A is an exploded view of the controller according to the embodiment of FIG. 2.

FIG. 4 is a cross-sectional view of the controller 100 according to the embodiment of FIG. 2, and FIG. 5A is an exploded view of the controller 100 according to the embodiment of FIG. 2. The controller 100 comprises a drive rod 132 and a diaphragm 140. A knob 120 is installed on the drive rod 132 to rotate the drive rod 132, and the knob 120 moves with the drive rod 132. The drive rod 132 is driven to move a distance to drive a diaphragm 140. The diaphragm 140 moves inside the chamber 285 shown in FIG. 3. The chamber is blocked by the diaphragm driven to reach a bottom of the chamber. A limiting element 122 is threaded into and encircles the drive rod 132 to contain a section of the drive rod 132. The knob 120 has an opening shell 121 to contain the limiting element 122.

Figure 5B:
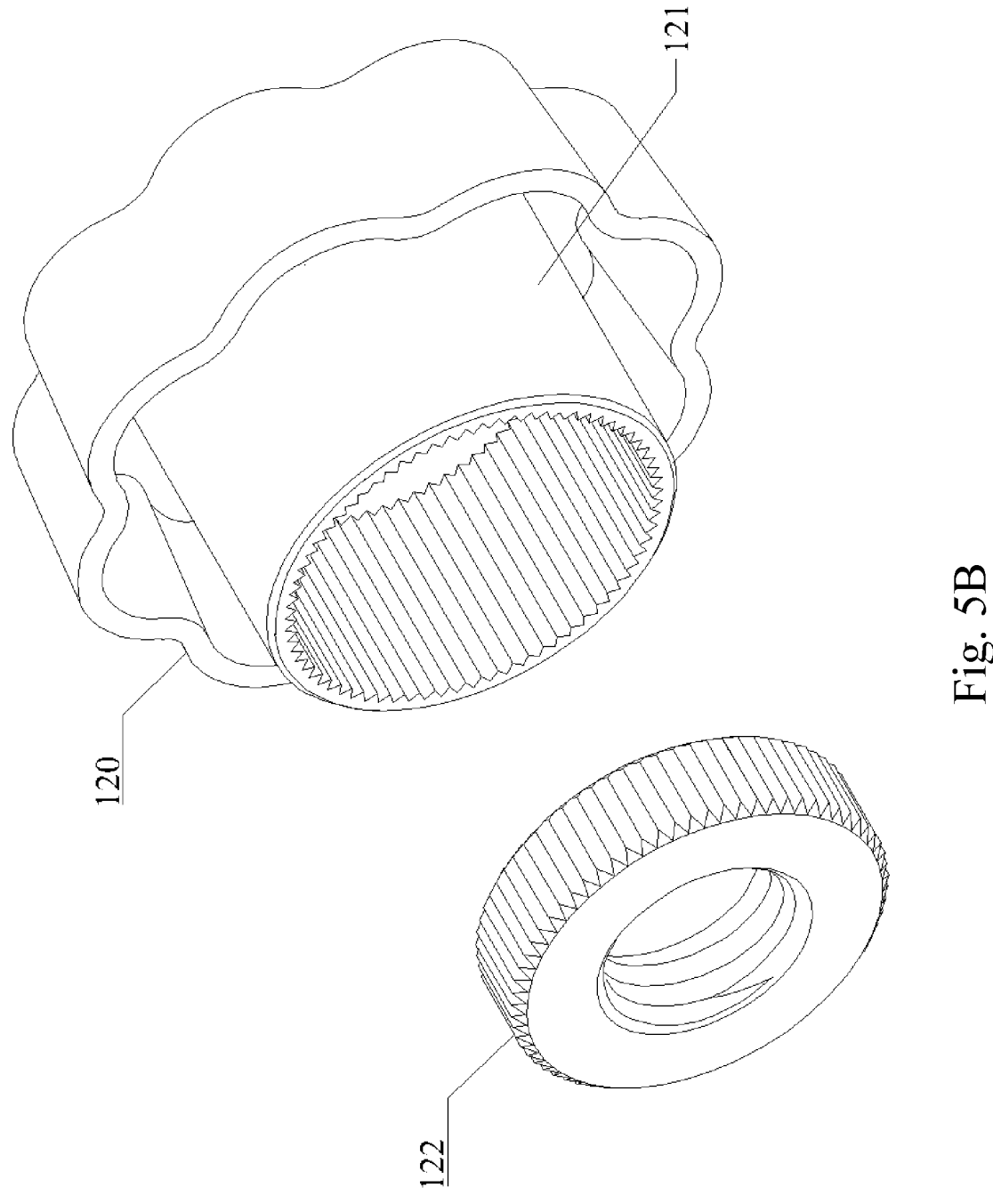
FIG. 5B is a perspective view of the knob and the limiting element according to the embodiment of FIG. 5A.

FIG. 5B is a perspective view of the knob 120 and the limiting element 122 according to the embodiment of FIG. 5A. The opening shell 121 of the knob 120 has longitudinal protrusions and grooves on an inner wall to match longitudinal protrusions and grooves on an outer wall of the limiting element 122.

After the opening shell 121 is inserted by the limiting element 122, the limiting element 122 is configured to be fixed at a position of the drive rod 132 to prevent the drive rod 132 from being overdriven. An inner case 128 is installed inside the controller 100, and the inner case 128 has a through hole for containing a part of the drive rod 132. The threaded sleeve 126 encircles the inner case 128 and covering the opening 210. The limiting element 122 moves with the drive rod 132 until the limiting element 122 touches the inner case 128, and the drive rod 132 stops moving when the limiting element 122 stops moving. Optionally, a protruding ring 133 encircles a bottom end of the drive rod 132 to prevent the drive rod 132 from disengaging the inner case 128. Below the drive rod 132, a connector 134 has a rod inserted into the diaphragm 140 and a round indentation to be inserted by the drive rod 132. A flange 136 and a gasket 138 are installed over the diaphragm 140 and inside the inner case 128. Optionally, a colored ring 124 encircles an upper opening of the inner case 128. The colored ring 124 is totally covered by the knob 120 when the diaphragm 140 reaches a position to totally block the chamber 285 of the body 200 shown in FIG. 3.

Figure 6:
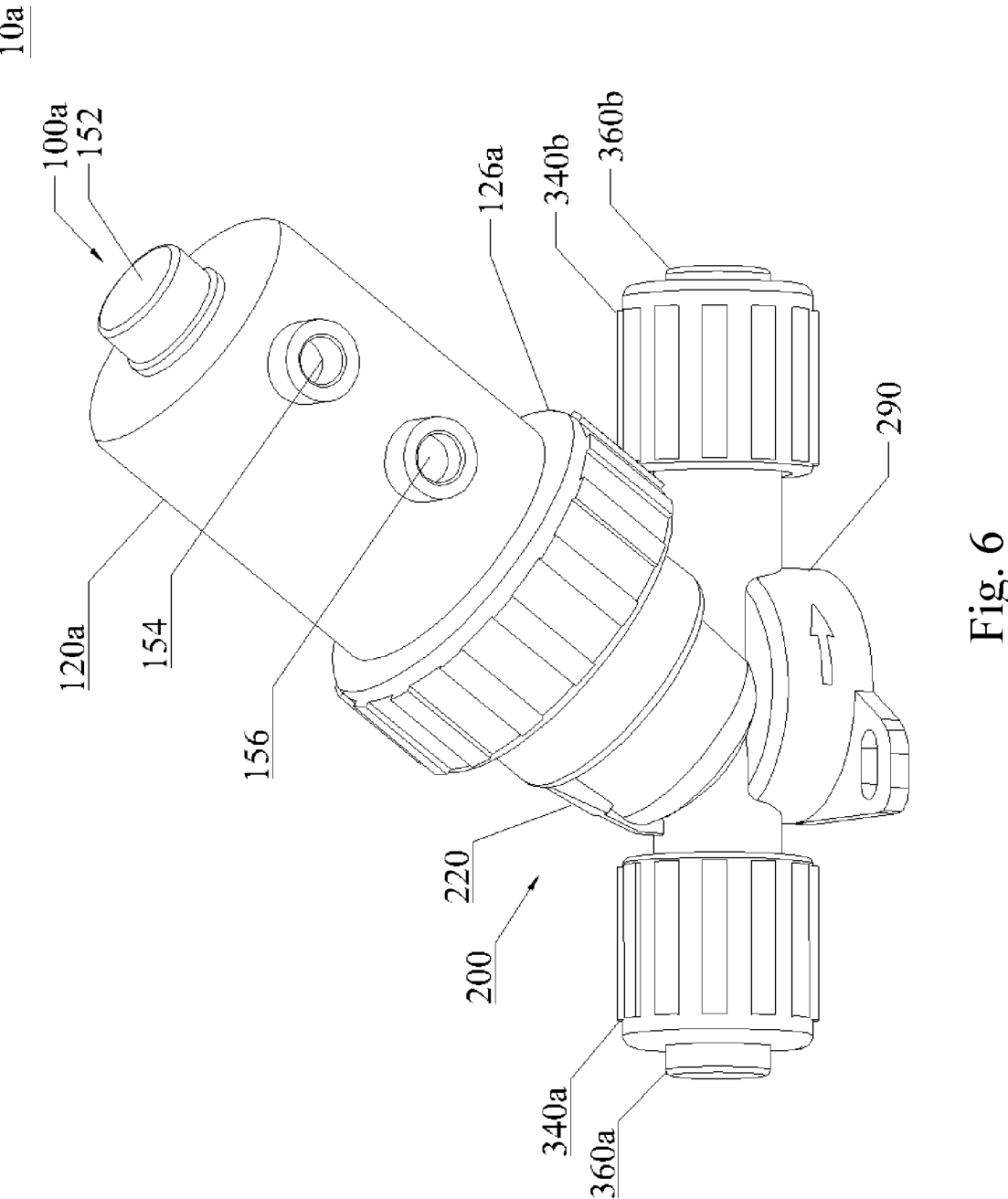
FIG. 6 is a perspective view of a diaphragm valve according to another embodiment of the present disclosure.
Figure 7:
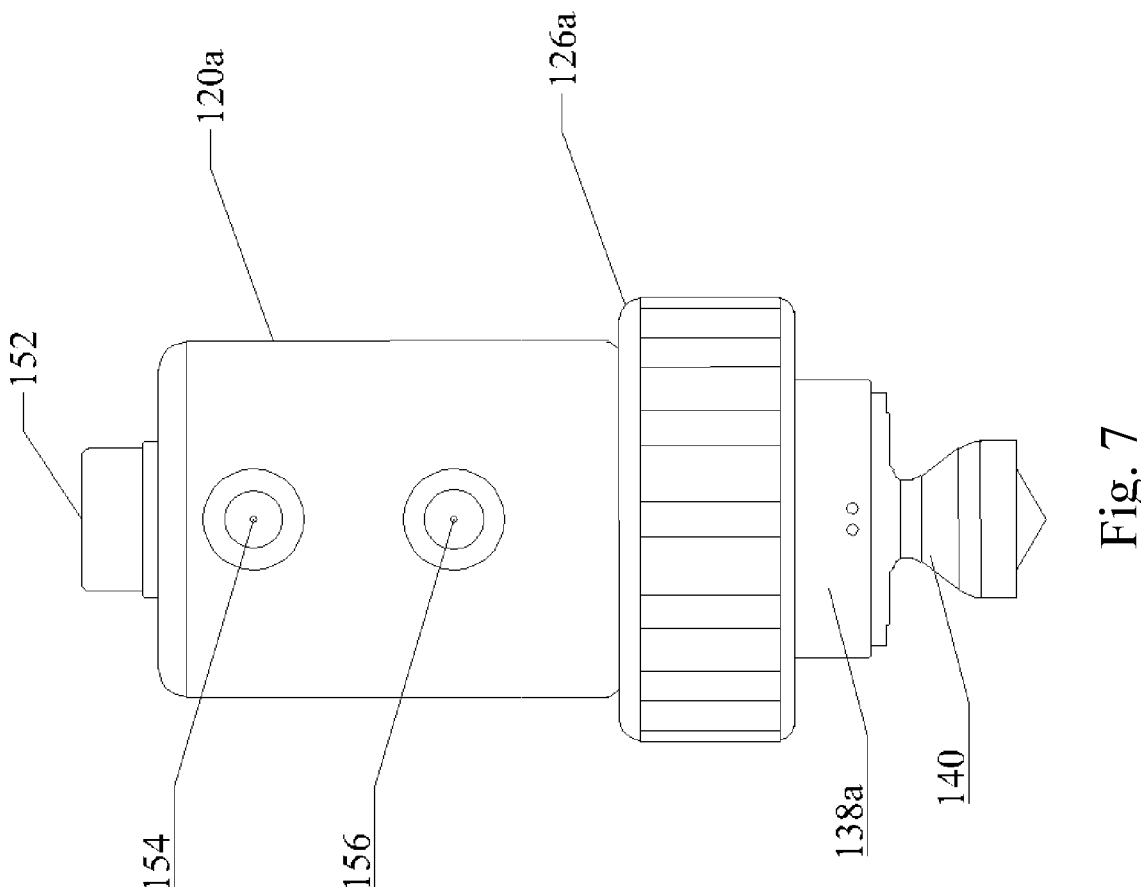
FIG. 7 is a perspective view of a controller of the diaphragm valve in FIG. 6.

FIG. 6 is a perspective view of a diaphragm valve 10a according to another embodiment of the present disclosure. FIG. 7 is a perspective view of a controller 100a of the diaphragm valve 10a in FIG. 6. As an alternative embodiment, the controller 100 of FIG. 2 can be replaced with a pneumatic controller 100a. of FIG. 7. As shown in FIG. 6, the diaphragm valve 10a comprises a controller 100a and a body 200. As shown in FIG. 7, the controller 100a comprises a cylinder 120a and a diaphragm 140. The diaphragm 140 is driven by the air pumped and exhausted through the pneumatic outlet 154 and the pneumatic inlet 156.

Figure 8:
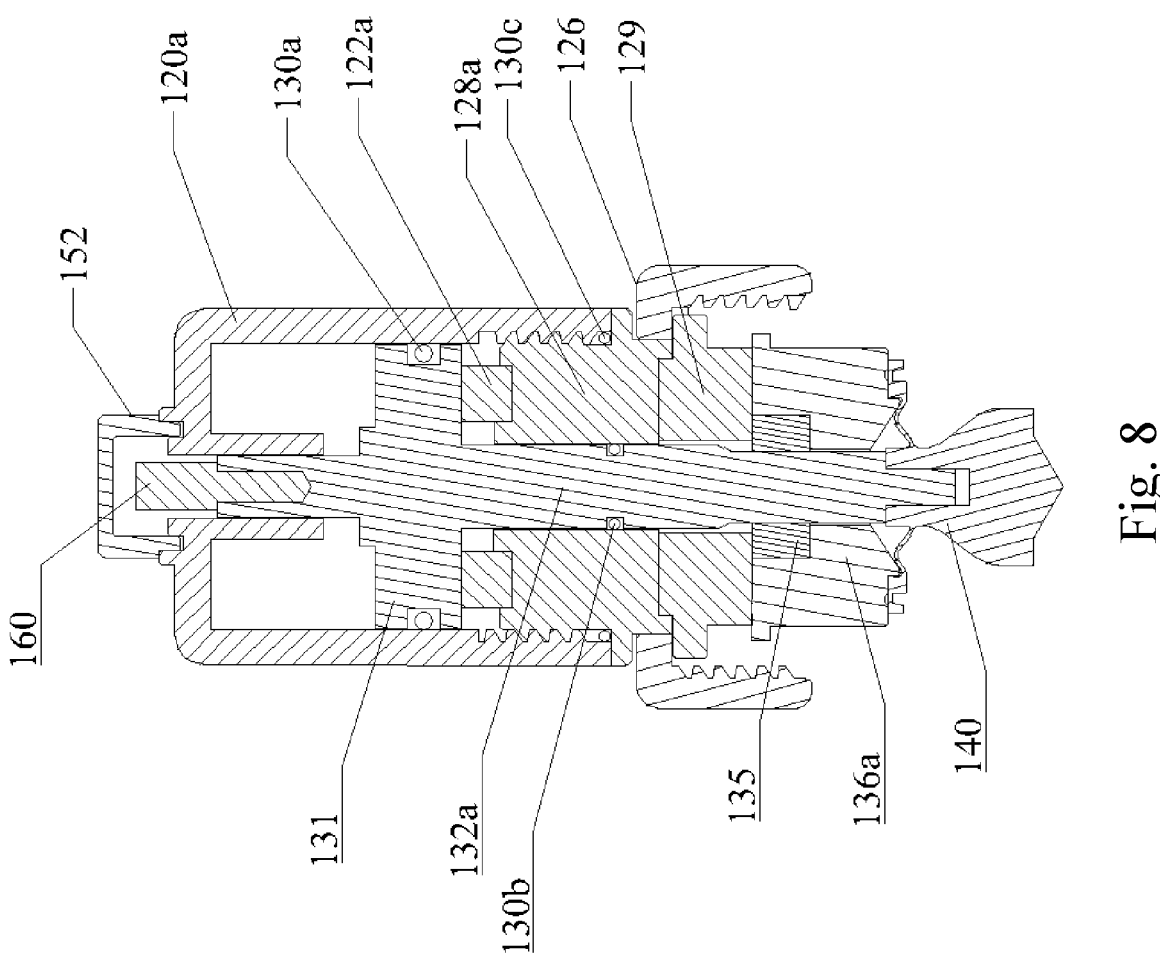
FIG. 8 is a cross-sectional view of the controller according to the embodiment of FIG. 7.
Figure 9:
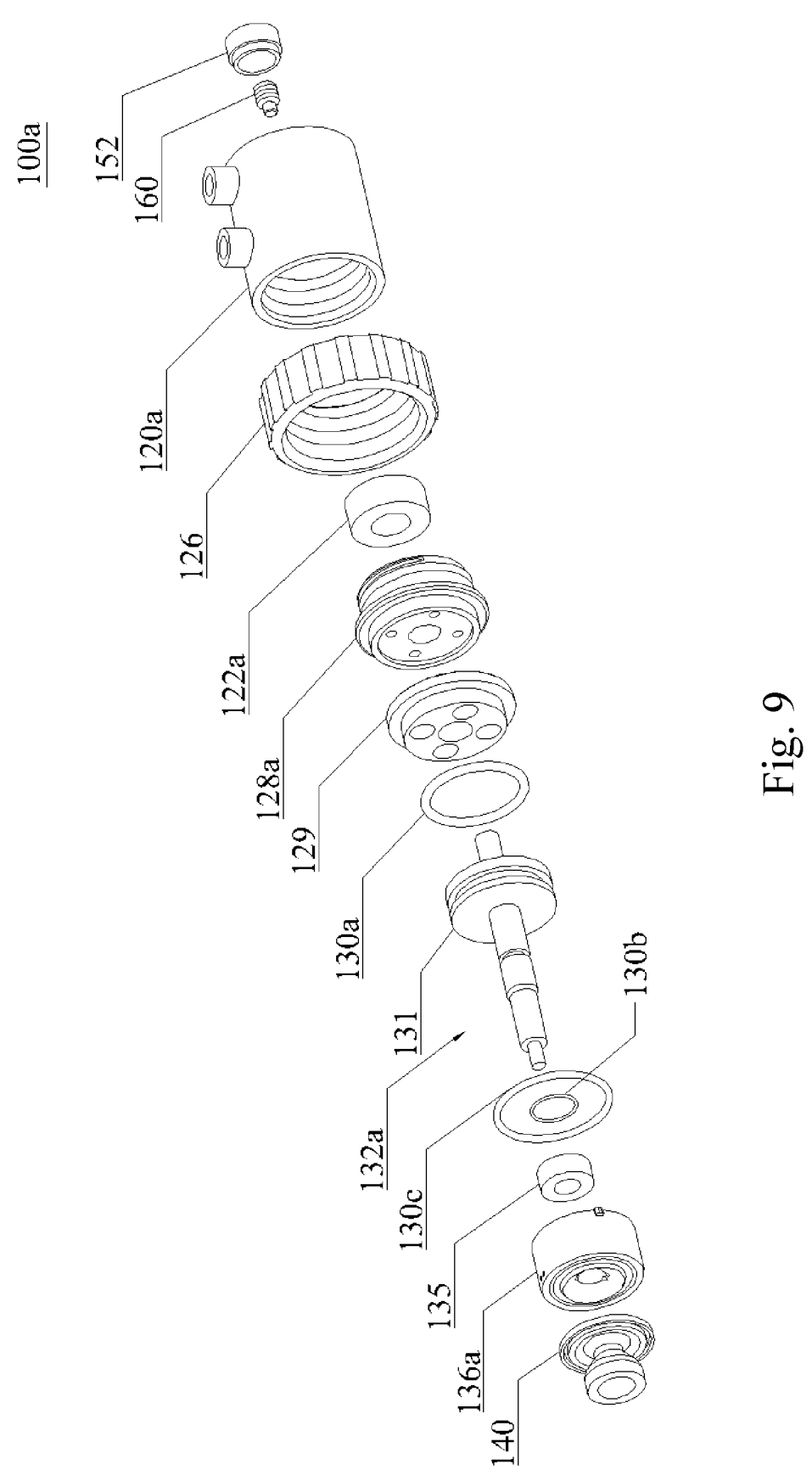
FIG. 9 is an exploded view of the controller according to the embodiment of FIG. 7.

FIG. 8 is a cross-sectional view of the controller according to the embodiment of FIG. 7, and FIG. 9 is an exploded view of the controller according to the embodiment of FIG. 7. In the controller 100a, a drive rod 132a has a piston 131 in a middle section. A cylinder 120a covers the controller 100a. A pneumatic outlet 154 and a pneumatic inlet 156 moves the drive rod 132a by pumping air into and exhausting air from a space between the cylinder 120a and the piston 131. The diaphragm 140 is driven by the drive rod 132a while the drive rod 132a moves. To stabilize the assembly, a flange 136a and a bushing 135 are installed over the diaphragm 140 and inside the opening 210 of the body 200 shown in FIG. 3. The opening 210 is covered by the controller 100a. The diaphragm 140 moving inside the chamber 285, and the chamber 285 is blocked by the diaphragm 140 driven to reach a bottom of the chamber 285. An inner case 128a is installed inside the controller 100a wherein the inner case 128a has a through hole for containing a part of the drive rod 132a. The threaded sleeve 126 encircles the inner case 128a and covering the opening 210 shown in FIG. 3. The inner case 128a and the case mount 129 are connected to secure the threaded sleeve 126. The cylinder 120a is installed on the inner case 128a, and the case mount 129 is placed inside the opening 210. A limiting element 122a is installed on the inner case 128a to encircle the drive rod 132a to contain a section of the drive rod 132a and separate the piston 131 from the inner case 128a. The piston 131 moves with the drive rod 132a until the piston 131 touches the limiting element 122a, and the drive rod 132a stops moving when the piston 131 stops moving. A thickness of the limiting element 122a is configured to set a length of the section of the drive rod 132a to prevent the drive rod 132a from being overdriven. To prevent leakage, a first o-ring 130a at an edge of the piston 131, and a second o-ring 130b encircling the drive rod 132a under the piston 131.

Figure 10:
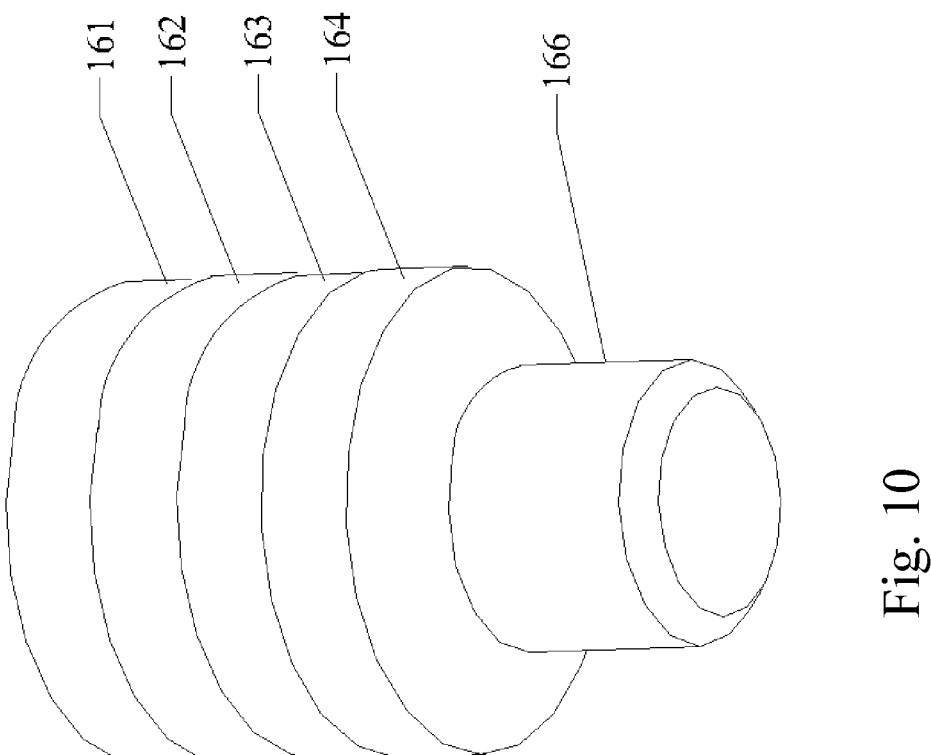
FIG. 10 is a perspective view of a bolt showing marks to indicate the depth of the diaphragm.

FIG. 10 is a perspective view of a bolt 160 showing marks 161-164 to indicate the depth of the diaphragm 140. The bolt 160 has a first end showing marks 161-164 and a second end 166 installed on a top end of the drive rod 132a. Referring to FIG. 9, a transparent cover 152 is on the cylinder 120a to cover the bolt 160. The marks 161-164 have layers of different colors and more layers are shown in the transparent cover 152 when less part of the drive rod 132a is inserted into the inner case 128a.

To sum up, the diaphragm valves described in the embodiments of the present disclosure can performed precise and accurate fluid control, and is extremely advantageous as a device used in, for example, a semiconductor production line or a production line of various chemicals.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A valve comprising:
   a controller comprising:
      a drive rod;
      a diaphragm driven by the drive rod;
      a knob for rotating the drive rod and the knob moves with the drive rod; and
      an inner case installed inside the controller wherein the inner case has a through hole for containing a part of the drive rod and a colored ring encircles an upper opening of the inner case; and
   a body comprising:
      an opening covered by the controller;
      a chamber containing the diaphragm moving inside the chamber wherein the chamber is blocked by the diaphragm driven to reach a bottom of the chamber; and a limiting element encircling the drive rod to contain a section of the drive rod wherein the limiting element is configured to be fixed at a position of the drive rod to prevent the drive rod from being overdriven and the colored ring is totally covered by the knob when the diaphragm reaches a position to totally block the chamber.

2. The valve of claim 1, wherein the knob has an opening shell to contain the limiting element, and the opening shell has longitudinal protrusions and grooves on an inner wall to match longitudinal protrusions and grooves on an outer wall of the limiting element.

3. The valve of claim 1, wherein the limiting element moves with the drive rod until the limiting element touches the inner case, and the drive rod stops moving when the limiting element stops moving.

4. The valve of claim 1, further comprising a threaded sleeve encircling the inner case and covering the opening.

5. The valve of claim 1, further comprising a protruding ring encircling a bottom end of the drive rod to prevent the drive rod from disengaging the inner case.

6. The valve of claim 1, further comprising a connector with a rod inserted into the diaphragm and a round indentation to be inserted by the drive rod.

7. A valve comprising:
   a controller comprising:
      a drive rod;
      a diaphragm driven by the drive rod;
      a knob for rotating the drive rod and the knob moves with the drive rod; and
      an inner case installed inside the controller wherein the inner case has a through hole for containing a part of the drive rod, and a colored ring encircles an upper opening of the inner case; and
   a body comprising:
      an opening covered by the controller;
      a chamber containing the diaphragm moving inside the chamber wherein the chamber is blocked by the diaphragm driven to reach a bottom of the chamber; and
      a limiting element encircling the drive rod to contain a section of the drive rod wherein a thickness of the limiting element is configured to set a length of the section of the drive rod to prevent the drive rod from being overdriven and the colored ring is totally covered by the knob when the diaphragm reaches a position to totally block the chamber.

8. The valve of claim 7, wherein the limiting element moves with the drive rod until the limiting element touches the inner case, and the drive rod stops moving when the limiting element stops moving.

9. The valve of claim 7, further comprising a protruding ring encircling a bottom end of the drive rod to prevent the drive rod from disengaging the inner case.

* * * * *